United States Patent
Yang et al.

(10) Patent No.: US 10,025,409 B2
(45) Date of Patent: Jul. 17, 2018

(54) TRANSPARENT CONDUCTIVE THIN FILM, SUBSTRATE, TOUCH SCREEN AND MANUFACTURING METHOD THEREOF, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Chengshao Yang, Beijing (CN); Binbin Cao, Beijing (CN); Yinhu Huang, Beijing (CN); Zhixiang Zou, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 16 days.

(21) Appl. No.: 15/222,341

(22) Filed: Jul. 28, 2016

(65) Prior Publication Data
US 2017/0192548 A1  Jul. 6, 2017

(30) Foreign Application Priority Data
Jan. 4, 2016  (CN) .......................... 2016 1 0003470

(51) Int. Cl.
G06F 3/041  (2006.01)

(52) U.S. Cl.
CPC .... *G06F 3/041* (2013.01); *G06F 2203/04103* (2013.01)

(58) Field of Classification Search
CPC .................. G06F 3/041; G06F 2203/04103
USPC .......................................................... 345/173
See application file for complete search history.

(56) References Cited

U.S. PATENT DOCUMENTS

| 2012/0048828 A1 | 3/2012 | Kim et al. |
| 2017/0060317 A1* | 3/2017 | Kim ..................... G06F 3/0416 |

FOREIGN PATENT DOCUMENTS

| CN | 103594498 A | * | 2/2014 |
| CN | 103594498 A | | 2/2014 |
| CN | 203588240 U | | 5/2014 |
| CN | 203930769 U | | 11/2014 |
| CN | 104795131 A | | 7/2015 |
| CN | 105204683 A | | 12/2015 |
| KR | 20100110463 A | | 10/2010 |

OTHER PUBLICATIONS

First Office Action regarding Chinese application No. 201610003470.2, dated Sep. 29, 2016. Translation provided by Dragon Intellectual Property Law Firm.
Second Office Action regarding Chinese application No. 201610003470.2, dated Nov. 7, 2016. Translation provided by Dragon Intellectual Property Law Firm.

* cited by examiner

*Primary Examiner* — Kumar Patel
*Assistant Examiner* — Kuo Woo
(74) *Attorney, Agent, or Firm* — Harness, Dickey & Pierce, P.L.C.

(57) ABSTRACT

This disclosure provides a transparent conductive thin film, a substrate, a touch screen and a manufacturing method thereof, and a display device. The transparent conductive thin film comprises a first metal oxide layer, a metal layer and a second metal oxide layer arranged in a stacking manner.

12 Claims, 4 Drawing Sheets

TRANSPARENT CONDUCTIVE THIN FILM, SUBSTRATE, TOUCH SCREEN AND MANUFACTURING METHOD THEREOF, AND DISPLAY DEVICE

CROSS-REFERENCE TO RELATED APPLICATION

This application claims a priority to Chinese Patent Application No. 201610003470.2 filed on Jan. 4, 2016, the disclosures of which are incorporated in their entirety by reference herein.

TECHNICAL FIELD

The present disclosure relates to the field of display technology, in particular to a transparent conductive thin film, a substrate, a touch screen and a manufacturing method thereof, and a display device.

BACKGROUND

With the development of the industry of touch screens, the touch screens have been required to tend to be frameless.

At present, signal transmission lines in a frame around a touch screen are usually made of a metal. Metal wires have good electrical conductivity, a small line width and a low resistance, and can meet the requirement of a narrow frame. However, since metals are not transparent, it is impossible to realize the framelessness of the touch screen by making the signal transmission lines using metal wires. In addition, ITO and other transparent conductive thin films have relatively high visible light transmittance but a relatively large resistance, and thus cannot be used to make the signal transmission lines of the touch screens.

Currently, only a narrow frame of the touch screen can be realized. To be specific, for a touch screen of a mobile phone, its frame has a width which may be controlled within a range of 2 to 3 mm; for a touch screen of a TPC (Touch PC)/NB (Notebook), its frame has a width which may be controlled to be around 5 mm; and for a touch screen of a MNT (a professional display), its frame has a width which may be controlled to be around 10 mm. But there is no technology that can realize the framelessness of the touch screen at present.

SUMMARY

The present disclosure aims to provide a transparent conductive thin film, a substrate, a touch screen and a manufacturing method thereof, and a display device, so as to realize the framelessness of the touch screen.

In order to solve said above-mentioned technical problem, the present disclosure provides technical solutions as follows.

According to one aspect of the present disclosure, a transparent conductive thin film is provided, which comprises a first metal oxide layer, a metal layer, and a second metal oxide layer arranged in a stacking manner.

Optionally, the transparent conductive thin film comprises a first IGZO (indium gallium zinc oxide) layer, a first manganese oxide layer, a metal layer, a second manganese oxide layer and a second IGZO layer stacked in order.

Optionally, the metal layer is made of copper or silver.

Optionally, when the metal layer is made of copper, the first IGZO layer has a thickness of 45 nm to 50 nm, the second IGZO layer has a thickness of 30 nm to 35 nm, the metal layer has a thickness of 10 nm to 15 nm, and the first manganese oxide layer and the second manganese oxide layer each have a thickness of 3 nm to 5 nm.

According to another aspect of the present disclosure, a substrate is provided, which comprises a plurality of signal transmission lines that are formed on a base substrate and made of the transparent conductive thin film as described above.

According to another aspect of the present disclosure, a touch screen is provided, which comprises the substrate as described above, the signal transmission lines being touch signal transmission lines connected with touch electrodes of the touch screen.

Optionally, the touch electrodes are made of the transparent conductive thin film.

According to a further aspect of the present disclosure, a display device comprising the touch screen as described above is provided.

According to a further aspect of the present disclosure, a method of manufacturing a touch screen is provided, which comprises:
providing a base substrate;
forming a vanishing layer on the base substrate;
forming touch electrodes on the vanishing layer;
forming a first planarization layer on the base substrate where the touch electrodes have been formed; and
forming, on the first planarization layer, touch signal transmission lines connected with the touch electrodes, using the transparent conductive thin film as described above.

Optionally, the step of forming the touch electrodes comprises forming the touch electrodes on the vanishing layer using the transparent conductive thin film as described above.

Optionally, after forming the touch signal transmission lines, the method further comprises forming a second planarization layer on the base substrate where the touch signal transmission lines have been formed.

The above-mentioned technical solutions of the present disclosure produce the following advantageous effects.

In the above-mentioned technical solutions of the present disclosure, the signal transmission lines of the substrate are made of a transparent conductive thin film which is composed of a metal oxide layer, a metal layer, and a metal oxide layer arranged in a stacking manner. The transparent conductive thin film having such a structure is transparent and has electrical conductivity not worse than metals. Making the signal transmission lines using said transparent thin film enables the requirement of resistivity to be met and the light transmittance not to be affected.

DETAILED DESCRIPTION

Figure 1:
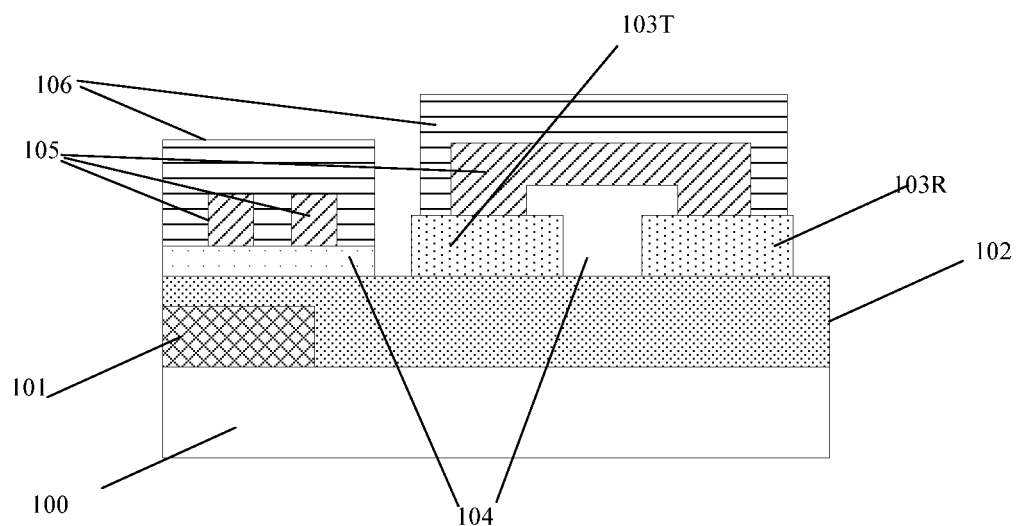
FIG. 1 is a structural schematic diagram of an array substrate in related art.

In order to make the technical problems to be solved by the present disclosure, the technical solutions and advantages of the present disclosure more clear, the present disclosure will be described in detail in conjunction with accompanying drawings and embodiments below.

To solve the problem of inability to realize the framelessness of the touch screen in related art, embodiments of the present disclosure provide a transparent conductive thin film, a substrate, a touch screen and a manufacturing method thereof, and a display device, whereby the framelessness of the touch screens can be realized.

According to an embodiment of the present disclosure, a transparent conductive thin film is provided, which comprises a metal oxide layer, a metal layer and a metal oxide layer arranged in a stacking manner.

In the embodiment of the present disclosure, the transparent conductive thin film is composed of a metal oxide layer, a metal layer and a metal oxide layer arranged in a stacking manner, and thus is transparent and has electrical conductivity not worse than metals. Signal transmission lines and electrodes can be made using said transparent conductive thin film, which enables the requirement of electrical resistivity to be met and the light transmittance not to be affected.

Optionally, the transparent conductive thin film is composed of a first IGZO layer, a first manganese oxide layer, a metal layer, a second manganese oxide layer and a second IGZO layer. Both the IGZO layers and the manganese oxide layers are transparent to visible light, and it is thus possible to obtain a transparent conductive thin film which is transparent and has electrical conductivity not worse than metals by selecting thicknesses of the respective layers according to the principle of inductive transmission.

Optionally, since copper or silver has good electrical conductivity, the metal layer may be made of copper or silver.

Optionally, when the metal layer is made of copper, the first IGZO layer may have a thickness of 45 nm to 50 nm, the second IGZO layer may have a thickness of 30 nm to 35 nm, the metal layer may have a thickness of 10 nm to 15 nm, and the first manganese oxide layer and the second manganese oxide layer may each have a thickness of 3 nm to 5 nm. With each of the layers having a thickness within said corresponding range, a transparent conductive thin film which is transparent and has electrical conductivity not worse than copper can be obtained.

According to another embodiment of the present disclosure, a substrate is provided, which comprises a plurality of signal transmission lines formed on a base substrate and made of a transparent conductive thin film which is the transparent conductive thin film composed of a metal oxide layer, a metal layer and a metal oxide layer arranged in a stacking manner as described above. The transparent conductive thin film having such a structure is transparent and has electrical conductivity not worse than metals. Making the signal transmission lines using said transparent conductive thin film enables the requirement of resistivity to be met and the light transmittance not to be affected.

Optionally, the transparent conductive thin film is composed of a first IGZO layer, a first manganese oxide layer, a metal layer, a second manganese oxide layer and a second IGZO layer. Both the IGZO layers and the manganese oxide layers are transparent to visible light, and it is thus possible to obtain a transparent conductive thin film which is transparent and has electrical conductivity not worse than metals by selecting thicknesses of the respective layers according to the principle of inductive transmission.

Optionally, since copper or silver has good electrical conductivity, the metal layer may be made of copper or silver.

Optionally, when the metal layer is copper, the first IGZO layer may have a thickness of 45 nm to 50 nm, the second IGZO layer may have a thickness of 30 nm to 35 nm, the metal layer may have a thickness of 10 nm to 15 nm, and the first manganese oxide layer and the second manganese oxide layer may each have a thickness of 3 nm to 5 nm. With each of the layers having a thickness within said corresponding range, a transparent conductive thin film which is transparent and has electrical conductivity not worse than copper can be obtained.

According to a further embodiment of the present disclosure, a touch screen is provided, which comprises the substrate as described above, wherein the signal transmission lines are touch signal transmission lines connected with touch electrodes of the touch screen.

Optionally, the touch signal transmission lines of the touch screen are made of a transparent conductive thin film which is composed of a metal oxide layer, a metal layer and a metal oxide layer arranged in a stacking manner. The transparent conductive thin film having such a structure is transparent and has electrical conductivity not worse than metals. Signal transmission lines made of said transparent conductive thin film can meet the requirement of resistivity and are also transparent. Therefore, there may be no need to further arrange a black matrix for sheltering the touch signal transmission lines in edge regions, and thus the framelessness of the touch screen can be realized.

Optionally, the touch electrodes of the touch screen may also be made of the transparent conductive thin film. The touch electrodes thus made are transparent and have good electrical conductivity.

According to a further embodiment of the present disclosure, a display device is provided, which comprises the touch screen as described above. The display device may be any product or component having a display function, such as a liquid crystal TV, a liquid crystal display, a digital photo frame, a mobile phone or a tablet computer. The display device further comprises a flexible circuit board, a print circuit board, and a backplate.

According to a further embodiment of the present disclosure, a method of manufacturing a touch screen is provided, which comprises:

providing a base substrate, forming a vanishing layer on the base substrate, forming touch electrodes on the vanishing layer, forming a first planarization layer on the base substrate where the touch electrodes have been formed, and forming, on the first planarization layer, touch signal transmission lines connected with the touch electrodes, using a transparent conductive thin film which comprises a metal oxide layer, a metal layer and a metal oxide layer arranged in a stacking manner.

Optionally, the touch signal transmission lines of the touch screen are made of a transparent conductive thin film which is composed of a metal oxide layer, a metal layer and a metal oxide layer arranged in a stacking manner. The transparent conductive thin film having such a structure is transparent and has electrical conductivity not worse than metals. Signal transmission lines made using the transparent conductive thin film can meet the requirement of resistivity and are transparent. Therefore, the step of forming a black matrix for sheltering the touch signal transmission lines in edge regions can be omitted, which not only saves one patterning process, but also can realize the framelessness of the touch screen.

Optionally, the transparent conductive thin film is composed of a first IGZO layer, a first manganese oxide layer, a metal layer, a second manganese oxide layer and a second IGZO layer. Both the IGZO layers and the manganese oxide layers are transparent to visible light, and it is thus possible to obtain a transparent conductive thin film which is transparent and has electrical conductivity not worse than metals by selecting thicknesses of the respective layers according to the principle of inductive transmission.

Optionally, the step of forming the touch electrodes comprises forming the touch electrodes on the vanishing layer using the transparent conductive thin film. The touch electrodes thus made are transparent and have good electrical conductivity.

Optionally, after forming the touch signal transmission lines, the method further comprises forming a second planarization layer on the base substrate where the touch signal transmission lines have been formed.

Figure 2:
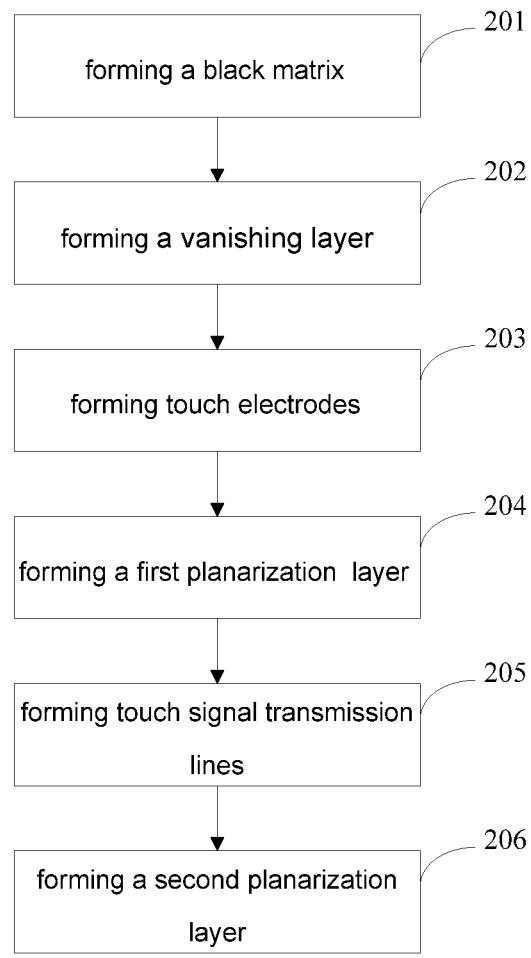
FIG. 2 is a schematic diagram of the manufacturing procedure of the array substrate in related art.

As shown in FIGS. 1 and 2, an array substrate in an OGS (One Glass Solution) touch screen (i.e., a touch screen formed by integrating touch glass and protective glass) in related art is usually made through five patterning processes. The method of manufacturing the array substrate comprises the following steps 201 to 206.

Step 201: providing a base substrate 100 which may be a glass or quartz substrate, and coating a layer of BM (Black Matrix) material on the base substrate 100 to form a pattern of black matrix 101 through a single patterning process. The black matrix 101 is mainly used to shelter dense metal wires in edge regions of the touch screen so that light reflected by the metal cannot be observed.

Step 202: forming a vanishing layer 102 on the base substrate 100 after step 201. The vanishing layer 102 is used to eliminate or reduce difference in reflectivity at metal wire jumpers and between touch electrodes and the base substrate 100, and thus reduce the possibility of wire jumpers being observed.

Step 203: depositing a transparent conductive layer on the base substrate 100 after step 202, and forming touch electrodes by a single patterning process. The touch electrodes comprise a transmission electrode 103T and a reception electrode 103R for sensing touch.

Step 204: coating a layer of an organic material on the base substrate 100 after step 203, and forming a first planarization layer 104 by a single patterning process.

Step 205: depositing a metal layer on the base substrate 100 after step 204, and forming an emitter electrode 103T and touch signal transmission lines 105 as edge wires by a single patterning process.

Step 206: coating a layer of an organic material on the base substrate 100 after step 205, and forming a second planarization layer 106 by a single patterning process.

After completing steps 201-206, an array substrate as shown in FIG. 1 can be obtained. In this array substrate, touch signal transmission lines are manufactured using the metal layer. Due to opaqueness of the metal, the framelessness of the touch screen cannot be realized. In order to solve this problem, in the embodiments of the present disclosure, a transparent conductive thin film is used to replace the metal wires, which achieves the purpose of making edge wires and wire jumpers where touch electrodes are connected transparent. The transparent conductive thin film has an optical characteristic very close to other areas of the touch screen, is difficult to be recognized and meets the requirement of resistivity, and thus the framelessness of the touch screen can be realized.

Figure 3:
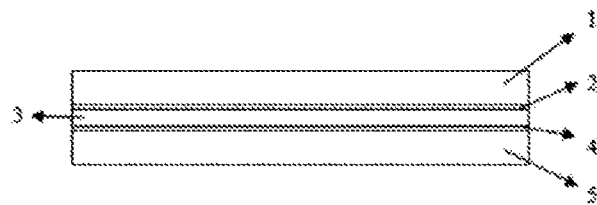
FIG. 3 is a structural schematic diagram of a transparent conductive thin film according to an embodiment of the present disclosure.

Optionally, the transparent conductive thin film may have a structure of oxide-metal-oxide. The materials and thicknesses of the respective thin films of the inductive transmission structure are designed according to the principle of inductive transmission so that a transparent conductive thin film which is transparent as well as conductive is realized. As shown in FIG. 3, in the embodiments of the present disclosure, the transparent conductive thin film is composed of a first IGZO layer 1, a manganese oxide layer 2, a metal layer made of copper 3, a second manganese oxide layer 4 and a second IGZO layer 5. Both the IGZO layers and the manganese layers are transparent to visible light. The first IGZO layer 1 has a thickness of 45 nm to 50 nm, the second IGZO layer 5 has a thickness of 30 nm to 35 nm, the copper layer 3 has a thickness of 10 nm to 15 nm, and the first manganese oxide layer 2 and the second manganese layer 4 each have a thickness of 3 nm to 5 nm.

Figure 4:
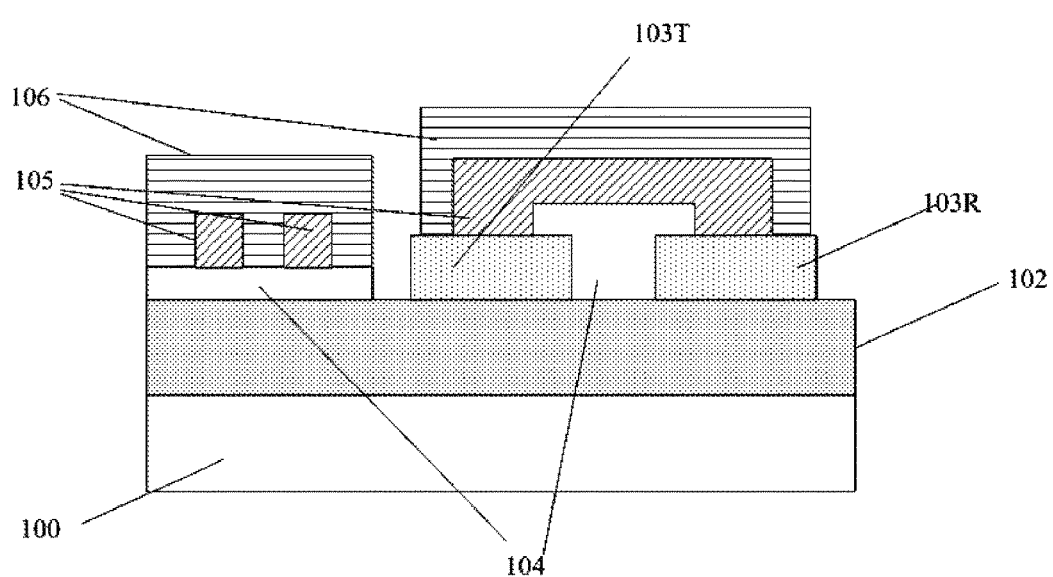
FIG. 4 is a structural schematic diagram of an array substrate according to an embodiment of the present disclosure.
Figure 5:
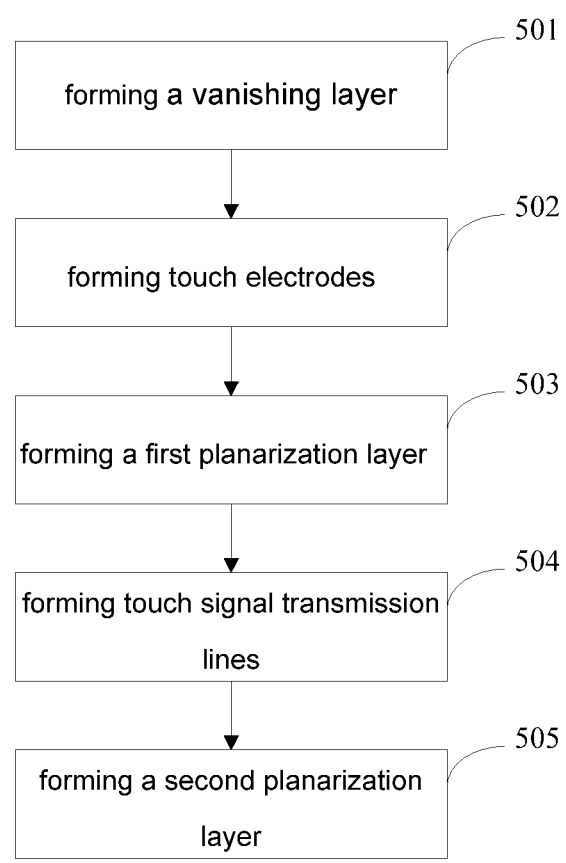
FIG. 5 is a schematic diagram of the manufacturing procedure of the array substrate according to the embodiment of the present disclosure.

As shown in FIGS. 4 and 5, the method of manufacturing the array substrate of the embodiment of the present disclosure comprises the following steps 501 to 505.

Step 501: providing a base substrate 100 which may be a glass or quartz substrate, and forming, on the base substrate 100, a vanishing layer 102 which is used to eliminate or reduce difference in reflectivity at metal wire jumpers and between touch electrodes and the base substrate 100 and thus reduce the possibility of wire jumpers being observed.

Step 502: depositing one transparent conductive layer on the base substrate 100 after step 501, and forming touch electrodes by a single patterning process. The touch electrodes comprise an emitter electrode 103T and a reception electrode 103R for sensing touch. The transparent conductive layer may be made of ITO or IZO. Optionally, the transparent conductive layer may also be the transparent conductive thin film as shown in FIG. 3.

Step 503: coating a layer of an organic material on the base substrate 100 after step 502, and forming a first planarization layer 104 by a single patterning process.

Step 504: depositing a transparent conductive thin film which has a structure as shown in FIG. 3 on the base substrate 100 after step 503, and forming the emitter electrode 103T and touch signal transmission lines 105 as edge wires by a single patterning process.

Step 505: coating a layer of an organic material on the base substrate 100 after step 504, and forming a second planarization layer 106 by a single patterning process.

After completing steps 501-505, an array substrate of the embodiment of the present disclosure can be formed. The transparent conductive thin film of the embodiment of the present disclosure has an optical characteristic very close to other areas of the touch screen, is difficult to be recognized and meets the requirement of resistivity, and thus the framelessness of the touch screen can be realized. Additionally, since the touch signal transmission lines are made of the transparent conductive thin film, there is no need to use a black matrix for sheltering, and a single patterning process can be thus saved. Further, since the touch signal transmission lines where the touch electrodes are connected are made of the transparent conductive thin film, the possibility of wire jumpers being observed is significantly reduced and the product yield of the touch screen is improved.

The above are optional embodiments of the present disclosure. It shall be indicated that, several improvements and modifications may also be made by a person skilled in the art without departing from the principle of the present disclo-

What is claimed is:

1. A transparent conductive thin film comprising stacked according to the following order, a first metal oxide layer including a first indium gallium zinc oxide (IGZO) layer and a first manganese oxide layer, a metal layer formed of silver, and a second metal oxide layer including a second manganese oxide layer and a second IGZO layer,
wherein the first IGZO layer has a thickness of 45 nm to 50 nm, the second IGZO layer has a thickness of 30 nm to 35 nm, the metal layer has a thickness of 10 nm to 15 nm, and the first manganese oxide layer and the second manganese oxide layer each have a thickness of 3 nm to 5 nm.

2. A method of preparing a frameless touch screen, comprising:
providing a base substrate;
forming a vanishing layer on the base substrate;
forming touch electrodes on the vanishing layer;
forming a first planarization layer on the base substrate where the touch electrodes have been formed; and
forming, on the first planarization layer, touch signal transmission lines connected with the touch electrodes, using the transparent conductive thin film according to claim 1.

3. The method of preparing the frameless touch screen according to claim 2, wherein a step of forming the touch electrodes comprises forming the touch electrodes on the vanishing layer using the transparent conductive thin film.

4. The method of preparing the frameless touch screen according to claim 2, wherein after forming the touch signal transmission lines, the method further comprises forming a second planarization layer on the base substrate where the touch signal transmission lines have been formed.

5. A substrate comprising a plurality of signal transmission lines formed on a base substrate, wherein the signal transmission lines are made of a transparent conductive thin film comprising, stacked according to the a first metal oxide layer including a first indium gallium zinc oxide (IGZO) layer and a first manganese oxide layer, a metal layer formed of silver, and a second metal oxide layer including a second manganese oxide layer and a second IGZO layer
wherein the first IGZO layer has a thickness of 45 nm to 50 nm, the second IGZO layer has a thickness of 30 nm to 35 nm, the metal layer has a thickness of 10 nm to 15 nm, and the first manganese oxide layer and the second manganese oxide layer each have a thickness of 3 nm to 5 nm.

6. A touch screen comprising the substrate according to claim 5, wherein the signal transmission lines are touch signal transmission lines connected with touch electrodes of the touch screen.

7. The touch screen according to claim 6, wherein the touch electrodes are made of the transparent conductive thin film.

8. A display device comprising the touch screen according to claim 6.

9. The display device according to claim 8, wherein the touch electrodes are made of the transparent conductive thin film.

10. A method of manufacturing a touch screen, comprising:
providing a base substrate,
forming a vanishing layer on the base substrate;
forming touch electrodes on the vanishing layer;
forming a first planarization layer on the base substrate where the touch electrodes have been formed; and
forming, on the first planarization layer, touch signal transmission lines connected with the touch electrodes, using the transparent conductive thin film according to claim 1.

11. The method of manufacturing the touch screen according to claim 10, wherein a step of forming the touch electrodes comprises forming the touch electrodes on the vanishing layer using the transparent conductive thin film.

12. The method of manufacturing the touch screen according to claim 10, wherein after forming the touch signal transmission lines, the method further comprises forming a second planarization layer on the base substrate where the touch signal transmission lines have been formed.

* * * * *